(12) United States Patent
Kojima

(10) Patent No.: US 6,407,971 B1
(45) Date of Patent: Jun. 18, 2002

(54) DISK RECORDING OR PLAYBACK DEVICE

(75) Inventor: Kazuyuki Kojima, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/518,259

(22) Filed: Mar. 3, 2000

(30) Foreign Application Priority Data

Mar. 4, 1999 (JP) ............................................. 11-056715

(51) Int. Cl.[7] .............................................. G11B 33/02
(52) U.S. Cl. ..................................................... 369/75.1
(58) Field of Search ............................. 369/75.1, 77.2; 360/99.02, 99.06, 96.5; 312/9.1; 361/600

(56) References Cited

U.S. PATENT DOCUMENTS

| | | | |
|---|---|---|---|
| 4,345,283 A | * 8/1982 | Maryschka | 360/96.6 |
| 4,717,976 A | * 1/1988 | Nishimura et al. | 360/97 |
| 5,072,317 A | * 12/1991 | Fukushima et al. | 360/71 |
| 5,359,478 A | * 10/1994 | Kawano | 360/96.6 |
| 5,768,237 A | * 6/1998 | Kanada et al. | 369/75.1 |
| 6,028,737 A | * 2/2000 | Khuu | 360/99.06 |

FOREIGN PATENT DOCUMENTS

| | | |
|---|---|---|
| EP | 0 547 944 A2 | 6/1993 |
| EP | 0 640 970 A2 | 3/1995 |
| EP | 0 643 392 A1 | 3/1995 |
| WO | WO 97/03440 | 1/1997 |

* cited by examiner

*Primary Examiner*—David Hudspeth
*Assistant Examiner*—Angel Castro
(74) *Attorney, Agent, or Firm*—Armstrong, Westerman & Hattori, LLP

(57) ABSTRACT

A mechanism for preventing the disengagement of a slide member from a lid during recording of signals on a disk comprises a restraining piece mounted on a chassis and retractably movable toward the slide member, and a latch member mounted on the slide member movably along the direction of movement of the restraining piece for the restraining piece to come into contact therewith. The latch member is movable between a locking position in which the latch member is engaged with a cabinet by being pushed by the restraining piece to prevent the movement of the slide member when signals are recorded on the disk and a standby position in which the latch member is free from the pushing contact of the restraining piece to permit the movement of the slide member in a mode other than the recording. The restraining piece and the chassis are movable along the direction of movement of the slide member within a range in which the restraining piece is in pushing contact with the latch member in the locking position.

2 Claims, 7 Drawing Sheets

DISK RECORDING OR PLAYBACK DEVICE

FIELD OF THE INVENTION

The present invention relates to disk recording or playback devices, and more particularly to a device having a mechanism for preventing a disk from inadvertently moving away from a pickup during recording.

BACKGROUND OF THE INVENTION

Devices are already known for use with a disk 6 rotatably encased in a cartridge 60 for recording or reproducing digital signals. FIG. 14 shows the principle of recording signals on the disk 6 which is in rotation in a horizontal plane. A magnetic field is applied by a recording head 72 to the disk 6 having a magnetic surface from the upper side thereof, and a laser beam is projected by a pickup 7 on the disk from therebelow. The portion of the disk 6 locally heated with the laser beam loses the coercive force when Curie temperature is reached (about 200° C.), so that the heated portion is instantaneously magnetized by the recording head 72. When moving out of the laser beam with the rotation of the disk 6, the heated portion is cooled, whereby the direction of magnetization is fixed.

If the disk 6 inadvertently becomes raised during recording, moving away from the pickup 7, accurate signals are not recorded on the disk 6 since the laser beam is brought out of the proper position. Accordingly, there is a need to provide an expediency for preventing the disk 6 from inadvertently moving away from the pickup 7 during recording. The following expediency is used conventionally.

FIG. 10 is a perspective view of a conventional disk recording or playback device commercially available, and FIG. 11 is a side elevation showing a cabinet 2 of FIG. 10 only in section. Pivoted as at 91 to a chassis 1 within the cabinet 2 are a lid 8 and a base end of a holder 9 for accommodating the cartridge 60. The lid 8 and the holder 9 are pivotally movable together. Disposed inside the front wall of the cabinet 2 is a slide member 4 movable leftward or rightward. The slide member 4 is provided with a hook piece 40 engageable with the lid 8, and a knob 43 projecting forward through a slit 20 in the front wall of the cabinet 2. The slide member 4 is biased by a spring 42 in a direction for the hook piece 40 to engage with the lid 8. When the knob 43 is pushed by hand against the force of the spring 42, the hook piece 40 is disengaged from the lid 8.

The chassis 1 is provided with a restraining piece 5 retractably movable toward the slide member 4 by a drive mechanism (not shown).

Pivoted to the chassis 1 is a head lever 71 positioned on the holder 9 and carrying the recording head 72 on its forward end. The holder 9, with the cartridge 60 inserted therein, is lowered by pushing by hand, while the head lever 71 is lowered by a lift mechanism (not shown). The recording head 72 is brought into contact with the disk 6 to record signals thereon. The chassis 1 is attached to the cabinet 2 by cushion members 10 and made movable to and fro sideways relative to the cabinet 2, whereby vibration, shake or impact given to the cabinet 2 is prevented from acting directly on the chassis 1, precluding the head lever 71 from jumping.

For recording, the hook piece 40 of the slide member 4 engages with the lid 8 as seen in FIG. 12. At this time, the restraining piece 5 is moved toward the slide member 4 to fit the forward end of the piece into an opening 48 of the slide member 4. A clearance H (see FIG. 13) in the opening 48 alongside the restraining piece 5 serving as an allowance is smaller than an allowance provided for the engagement of the hook piece 40 with the lid 8, such that even if the user inadvertently pushes the knob 43 sideways by hand, the lid 8 will not be released from the hook piece 40. Since the lid 8 and the holder 9 do not open inadvertently during recording, the cartridge 60 will not move away from the pickup 7, ensuring a stabilized operation for recording signals on the disk 6.

The conventional device nevertheless has the following problem.

The restraining piece 5 is attached to the chassis 1, which is made movable to and fro within the cabinet 2 by the cushion members 10. If the clearance H is small in this case, the amount the chassis 1 is allowed to move to and fro sideways relative to the cabinet 2 is small. Accordingly, when the cabinet 2 is subjected to vibration or is shaken, the restraining piece 5 is liable to contact an edge of the opening portion 48, delivering the shake to the chassis 1 easily. Consequently, the head lever 71 jumps to result in an unstable recording operation, and the cushion members 10 provided become less effective. Further, if the clearance H is small, the chassis 1 needs to be installed in the cabinet 2 with high accuracy since errors are not allowable in positioning the chassis 1 relative to the cabinet 2.

Conversely, if the clearance H is great, the lid 8 is liable to become disengaged from the hook piece 40, permitting the lid 8 and the holder 9 to open inadvertently during recording. Thus, faults will occur if the clearance H is great or small.

SUMMARY OF THE INVENTION

An object of the present invention is to provide a device of the type described wherein the slide member is locked during recording of signals while permitting movement of the chassis and the restraining piece, with the slide member held in its locked position, when the device is subjected to external impact.

A slide member 4 engageable with and disengageable from a lid 8 as pivotally moved to a lowered position is provided with a latch member 3 having a wide pushable surface orthogonal to the direction of retractable movement of a restraining piece 5 and movable in the direction of retractable movement of the restraining piece 5.

The latch member 3 is movable between a locking position in which the latch member 3 is engaged with a cabinet 2 by being pushed by the restraining piece 5 to prevent the movement of the slide member 4 when signals are recorded on a disk and a standby position in which the latch member 3 is free from the pushing contact of the restraining piece 5 to permit the movement of the slide member 4 in a mode other than the recording. The restraining piece 5 and a chassis 1 are movable in the direction of movement of the slide member 4 within a range in which the restraining piece 5 is in pushing contact with the pushable surface of the latch member 3 in the locking position.

During recording of signals on the disk, the latch member 3 is in the locking position, i.e., in engagement with the cabinet 2 by being pushed by the restraining piece 5, preventing the movement of the slide member 4. To restrain the slide member 4 from moving by engaging the latch member 3 with the cabinet 2, the latch member 3 is held pushed toward the cabinet by the restraining piece 5.

Accordingly, the slide member 4 remains immovable even when the chassis 1 moves along the direction of movement of the slide member 4 within the range in which the restraining piece 5 is in pushing contact with the pushable surface of the latch member 3. While holding the latch member 3 pushed toward the cabinet 2, the restraining piece 5 and the chassis 1 are movable along the direction of movement of the slide member 4 with an allowance involved, and are allowed to move more greatly than in the conventional arrangement. Further the restraining piece 5 and the chassis 1 are allowed to move in a direction orthogonal to the direction of movement of the slide member 4 if the latch member 3 is in engagement with the cabinet 2. Thus, even if the cabinet 2 is shaken, the chassis 1 is free to move to and fro along the direction of movement of the slide member 4, i.e., leftward or rightward, or forward or backward. This diminishes the likelihood that the shake will be delivered to the chassis 1 to ensure a stabilized recording operation.

The chassis 1 is allowed to move to and fro greatly, with the latch member 3 in engagement with the cabinet 2, consequently ensuring a stabilized recording operation in spite of shaking that could occur, even if the engagement of the latch member 3 with the cabinet 2 involves a diminished clearance. When the clearance is thus reduced, the movement of the slide member 4 can be restrained reliably, obviating the likelihood of the lid 8 and the holder 9 opening inadvertently.

Further because the chassis 1 can be positioned relative to the cabinet 2 with a greater lateral allowance involved than conventionally, high accuracy will not be required in installing the chassis 1 in the cabinet 2.

DESCRIPTION OF THE PREFERRED EMBODIMENT

An embodiment of the present invention will be described below in detail with reference to the drawings.

Figure 5:
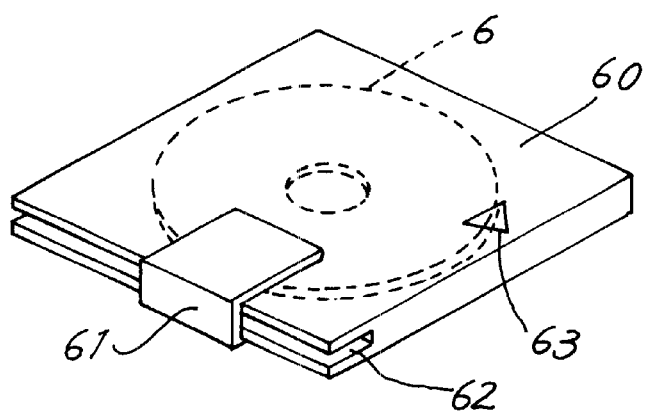
FIG. 5 is a perspective view of the cartridge.

FIG. 5 is a perspective view of a cartridge 60 for use in a signal recording or reproduction device for a disk 6. The cartridge 60 has a groove 62 formed in one side portion thereof and covered with a shutter 61. The cartridge 60 contains the disk 6, which is partly exposed when the shutter 61 is open. The cartridge 60 is inserted into the device with an arrow 63 on its upper surface directed toward the device.

Figure 1:
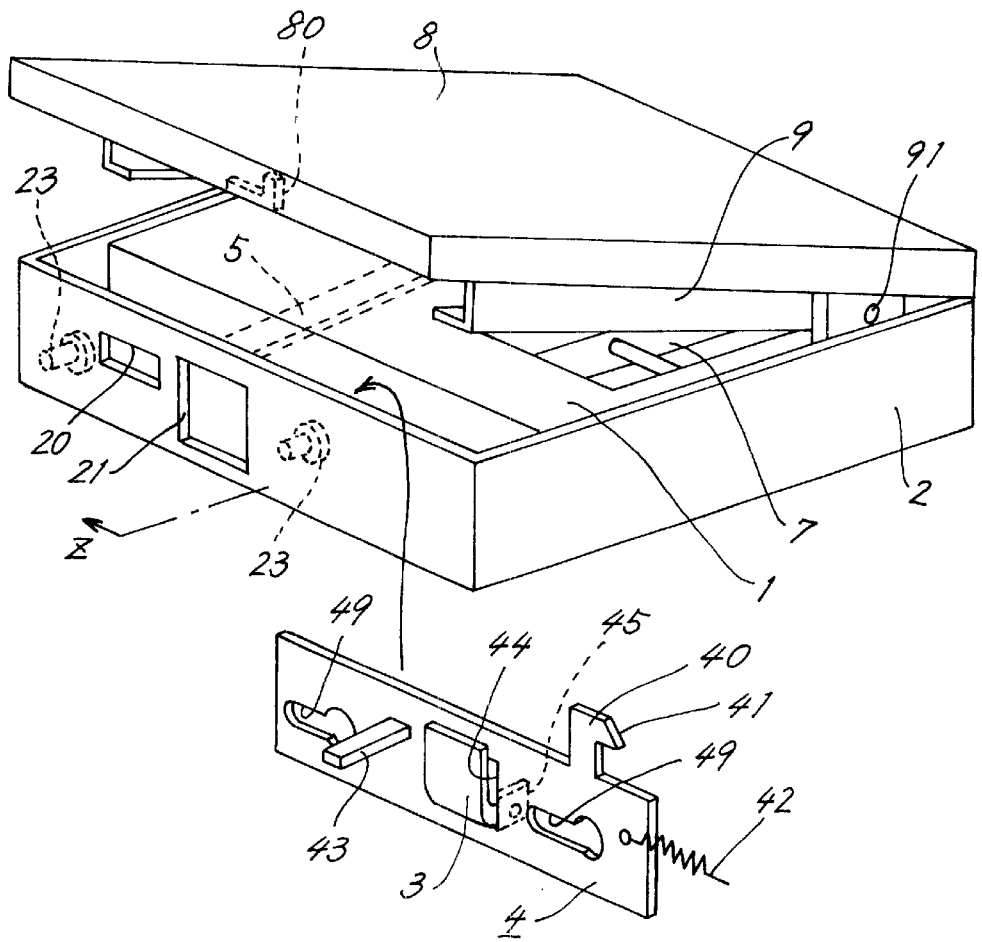
FIG. 1 is a perspective view of a disk recording or playback device.

FIG. 1 is a perspective view of the signal recording or reproduction device. A cabinet 2 has a lid 8 pivoted to one end thereof and a chassis 1 disposed therein. Pivoted to the chassis 1 is a holder 9 for holding the cartridge 60 therein. The holder 9 is connected to the lid 8 as will be described later and pivotally movable therewith.

Extending inward from the front wall of the cabinet 2 are support pins 23, 23 fitting in respective lateral slits 49, 49 of a slide member 4 made of a metal plate. The slide member 4 is movable leftward or rightward as supported by the pins 23, 23 fitting in the slits 49, 49. The slide member 4 has a projecting hook piece 40 formed with a slope 41 and is biased rightward by a spring 42 connected between the member 4 and the cabinet 2. A knob 43 projecting from the slide member 4 extends through a slit 20 in the front wall of the cabinet 2 and is manually moved by the user.

Figure 2:
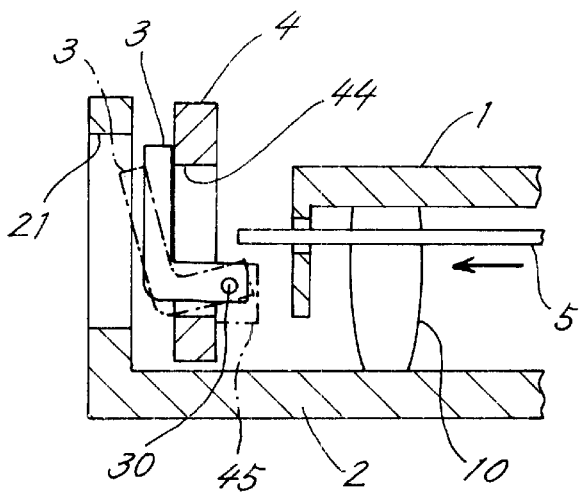
FIG. 2 is a fragmentary side elevation in section of the same when a cabinet thereof is seen in the direction of arrow Z in FIG. 1.

Positioned between the knob 43 and the hook piece 40 is an aperture 44 formed in the slide member 4. A lug 45 raised from the slide member 4 by slitting projects from a side-edge lower end portion of the apertured portion 44 toward the chassis 1. FIG. 2 is a side elevation in section of the cabinet 2 as it is seen in the direction of arrow Z in FIG. 1. The aperture 44 has fitted therein a latch member 3 L-shaped in section and supported at a lower end portion thereof by a pivot 30 on the lug 45. The latch member 3 has a pushable surface extending laterally, is biased clockwise by a torsion spring (not shown) fitted to the pivot 30 and has an upper end portion in contact with the upper side of the apertured portion 44. The front wall of the cabinet 2 has an opening 21 opposed to the latch member 3 and slightly greater than the latch member 3 in lateral width. When the latch member 3 is moved about the pivot 30 to fit its upper end portion into the opening 21, the slide member 4 is restrained from moving leftward or rightward. The latch member 3 may be fittable into the opening 21 snugly or loosely with a small allowance.

The chassis 1 is attached to the cabinet 2 by cushion members 10 of urethane rubber or the like, and is movable to and fro sideways relative to the cabinet 2 (see FIG. 8), such that even if the cabinet 2 is shaken, the shake to be delivered to the chassis 1 is attenuated, preventing the head lever 71 to be described later from jumping.

The chassis 1 is provided under the lower surface thereof with a restraining piece 5 opposed to the latch member 3 and retractably movable toward the slide member 4. The forward end of the restraining piece 5 is opposed to a portion of the latch member 3 above the pivot 30 thereof. The restraining piece 5 moves toward the slide member 4 to push the pushable surface of the latch member 3.

Figure 3:
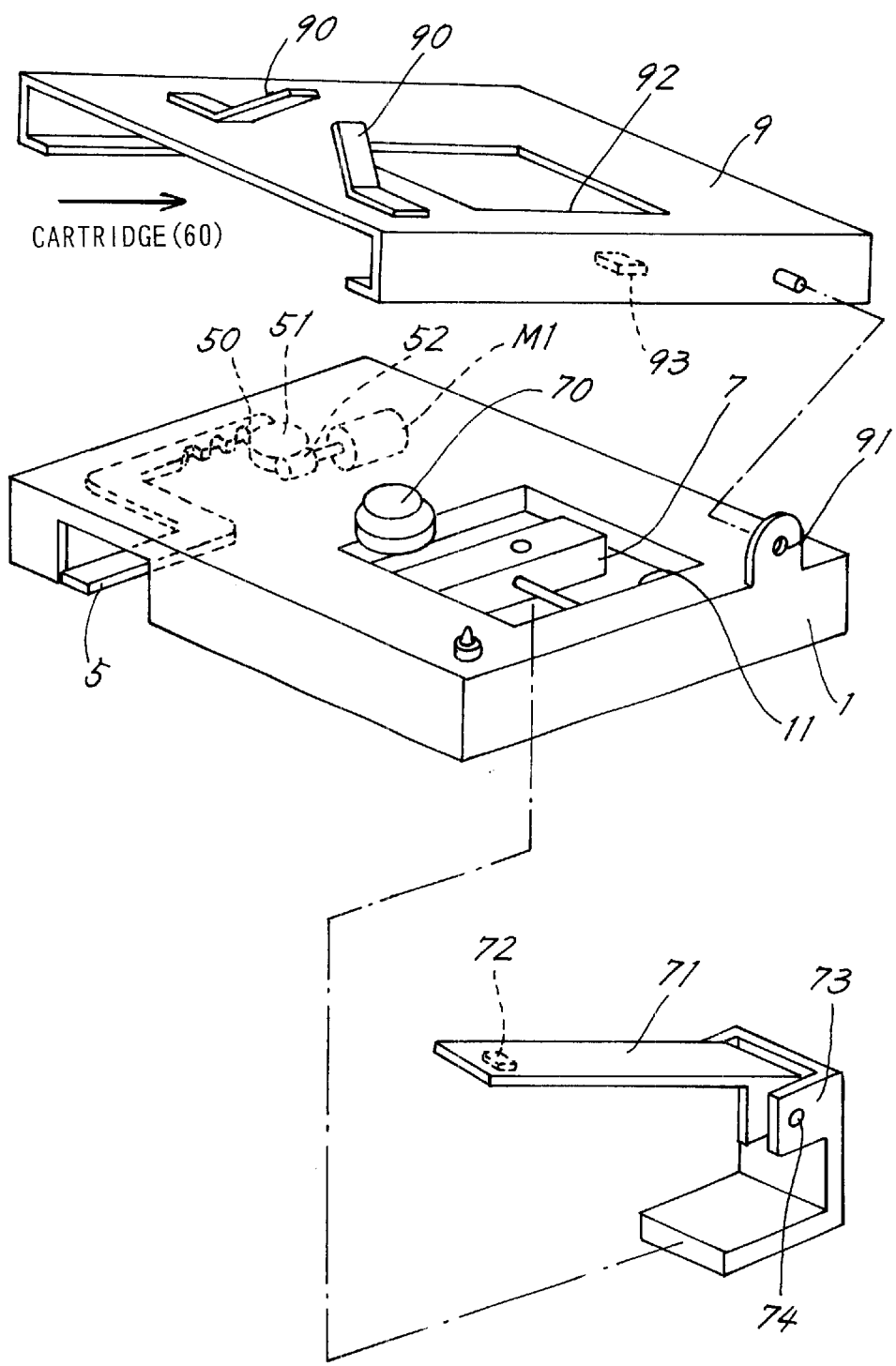
FIG. 3 is an exploded perspective view of a chassis and a holder.

FIG. 3 is an exploded perspective view of the chassis 1 and the holder 9. Plate springs 90, 90 each have one end attached to the upper surface of the holder 9 and the other end attached to the rear surface of the lid 8 deformably through deflection (see FIG. 8). Projecting from a side wall of the holder 9 is a lug 93 for opening the shutter 61 of the cartridge 60 by advancing into the groove 62 thereof (see FIG. 5). The shutter 61 is open when the cartridge 60 is in the holder 9.

Provided on the rear side of the chassis 1 is a motor M1 having a drive shaft 52 in mesh with an intermediate gear 51.

The restraining piece 5 has a rear end formed with a rack 50, which is in mesh with the intermediate gear 51. The restraining member 5 is advanced from or retracted toward the chassis 1 by the rotation of the motor M1.

Figure 11:
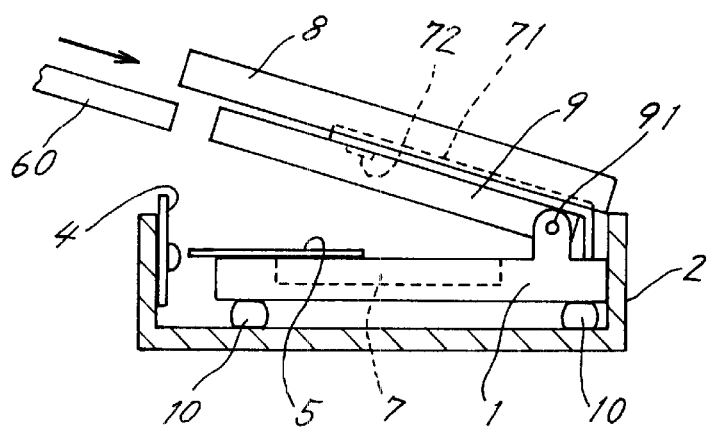
FIG. 11 is a side elevation showing the same with a cabinet in section.
Figure 12:
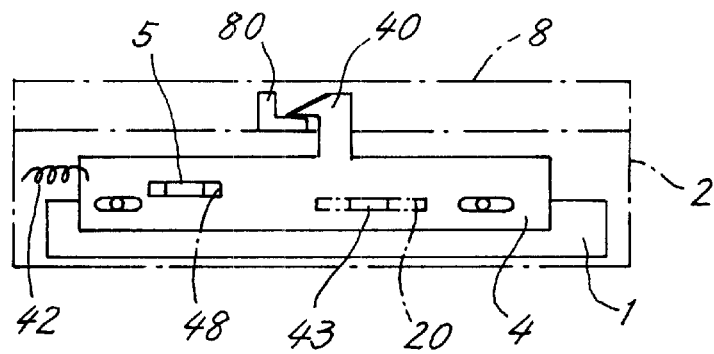
FIG. 12 is a front view showing the cabinet and a lid in chain lines.
Figure 13:
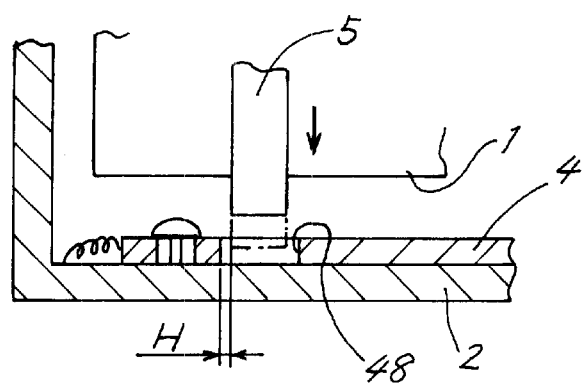
FIG. 13 is a plan view showing the position relationship between a slide member and a restraining piece.
Figure 14:
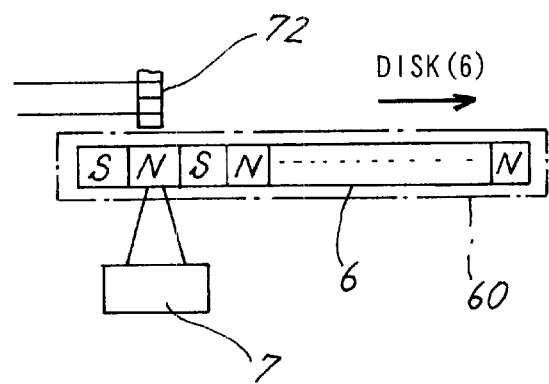
FIG. 14 is a diagram showing the principle of recording on a disk being rotated in a horizontal plane.

The chassis 1 has an opening 11 provided therein with a turntable 70 for rotating the disk 6 and a pickup 7 movable toward or away from the turntable 70 for projecting a laser beam on the disk 6. A bracket 73 is attached to the rear side of the pickup 7, and the head lever 71 has a base end pivoted as at 74 to an upper end portion of the bracket 73. As in the prior art, the head lever 71 is positioned between the upper surface of the holder 9 and the rear surface of the lid 8 (see FIG. 11). A recording head 72 is mounted on a free end of the head lever 71.

Mode Other than Recording Mode

Figure 4A:
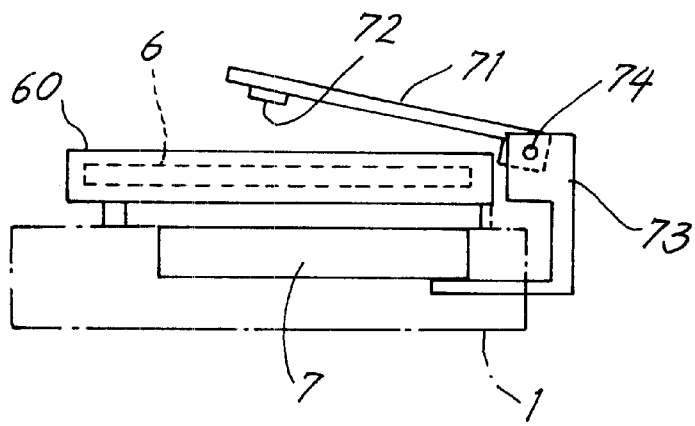
FIG. 4A is a side elevation showing the position relationship between a head lever and a cartridge in a mode other then a recording mode.

The head lever 71 is in a raised position as shown in FIG. 4 while the device is in a mode other than a recording mode, for example, when the device is a playback mode or out of operation.

In the disk playback mode, the pickup 7 projects a laser beam of lower output level than when recording so as not to disturb the direction of magnetization on the disk 6. The beam reflected from an S pole on the disk 6 differs from the beam reflected from an N pole thereon in the inclination of plane of polarization, so that signals of 0 and 1 levels are detected from this difference of inclination.

Recording Mode

Figure 4B:
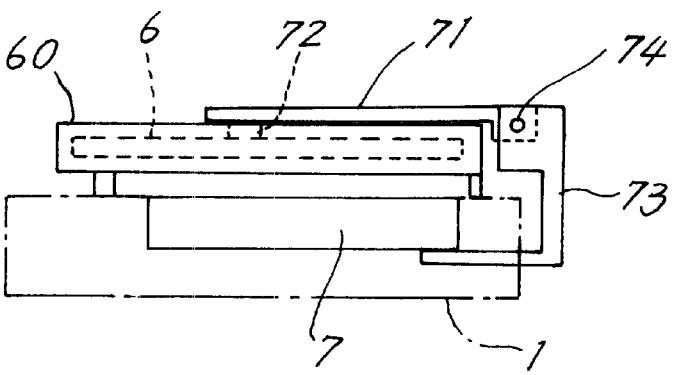
FIG. 4B is a similar view showing the same during recording.

For recording, the head lever 71 is pivotally moved down by a lift mechanism (not shown) as seen in FIG. 4B, causing the recording head 72 to pass through an opening 92 (see FIG. 3) in the wall of the holder 9 and come into contact with the disk 6 in the cartridge 60. The pickup 7 projects a laser beam on the disk 6 as previously stated, while the recording head 72 is energized to record signals on the disk 6.

Figure 7:
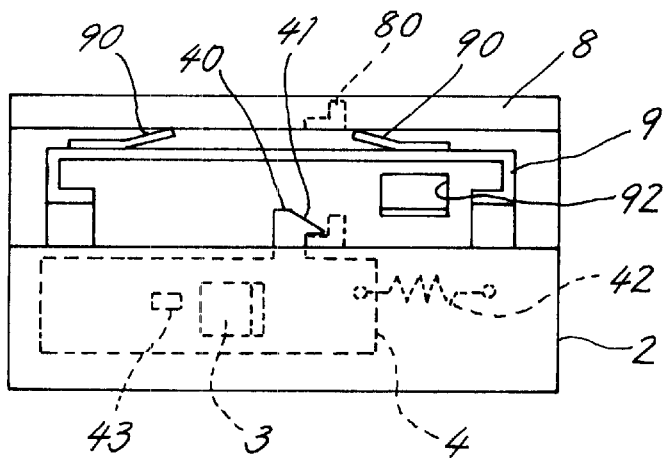
FIG. 7 is a front view showing the holder and a lid as opened.
Figure 8:
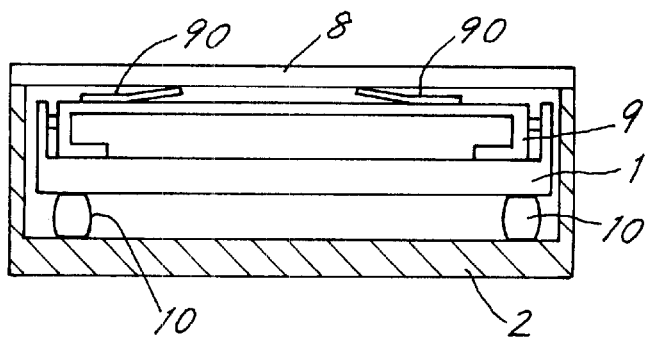
FIG. 8 is a front view in section showing the lid as closed.
Figure 9:
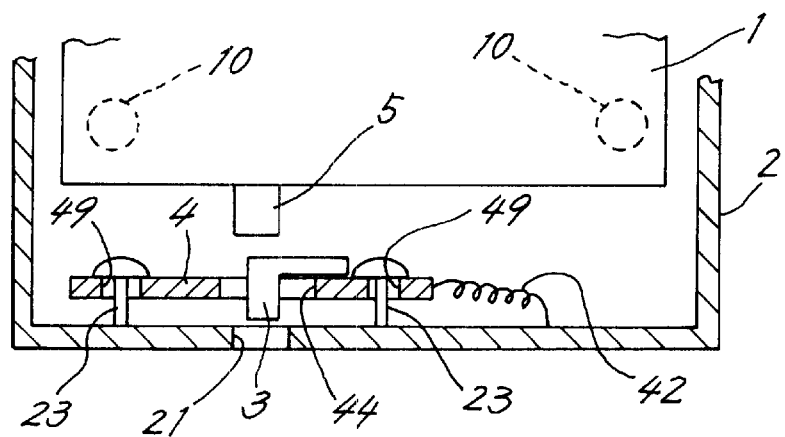
FIG. 9 is a plan view showing a different latch member.
Figure 10:
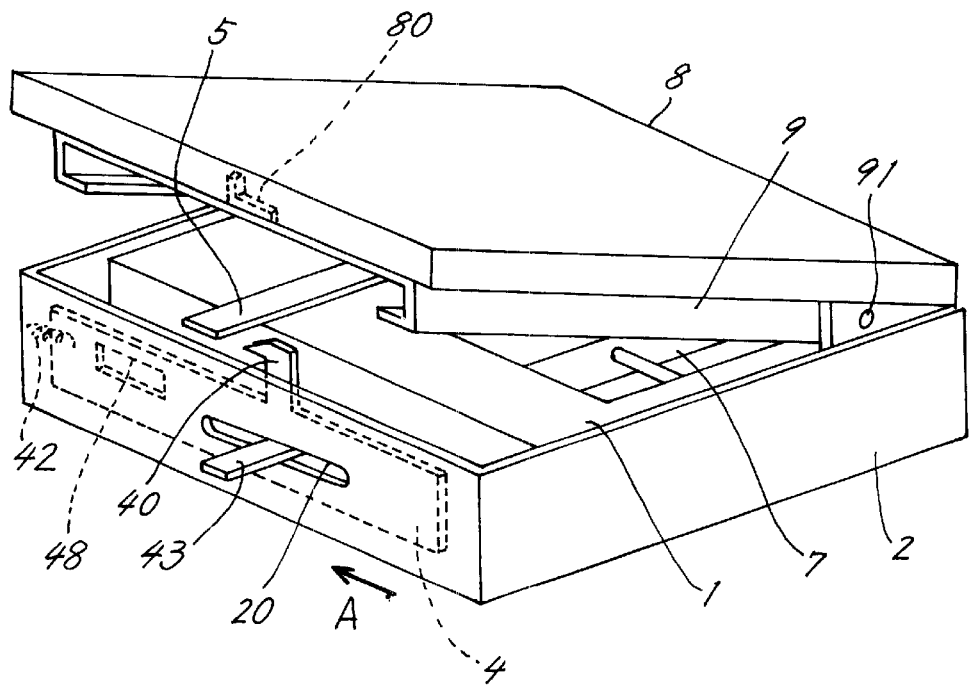
FIG. 10 is a perspective view of a conventional disk recording or playback device.

FIG. 7 is a plan view of the holder 9 and the lid 8 as opened. The lid 8 has an engaging piece 80 inside of its front end. When the lid 8 is closed, the engaging piece 80 comes into contact with the slope 41 of the hook piece 40, pushing the slide member 4 leftward against the action of the spring 42. Upon the engaging piece 80 moving past the slope 41, the slide member 4 is returned by the spring 42, bringing the hook piece 40 into engagement with the engaging piece 80. When the lid 8 is in its closed position, the holder 9 is in contact with the chassis 1, and the plate springs 90, 90 on the holder 9 are elastically deformed with their upper ends pressed by the lid 8 as seen in FIG. 8.

When the knob 43 is pushed leftward by hand against the action of the spring 42, the hook piece 40 is disengaged from the engaging piece 80, whereupon the 5 plate springs 90, 90 elastically restore themselves, raising the lid 8 and permitting the user to manually open the lid 8 and the holder 9 connected to the lid 8.

Figure 6A:
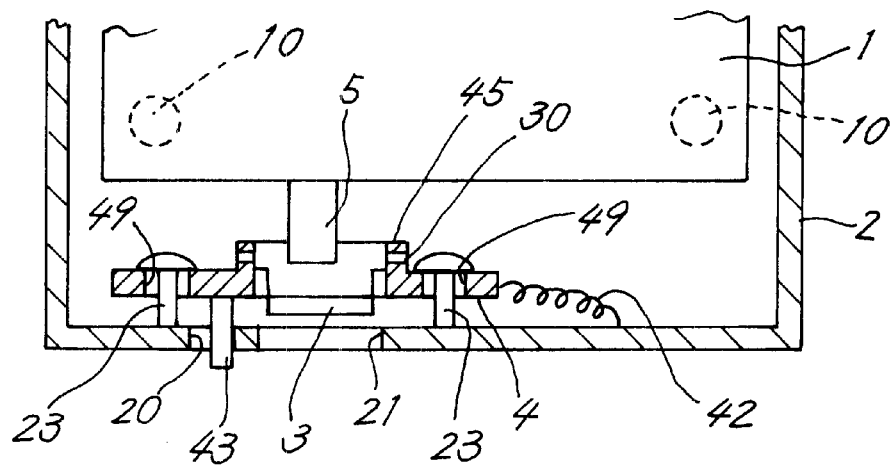
FIG. 6A is a plan view in section along a horizontal plane and showing a slide member and the cabinet as seen from above in the mode other than the recording mode.
Figure 6B:
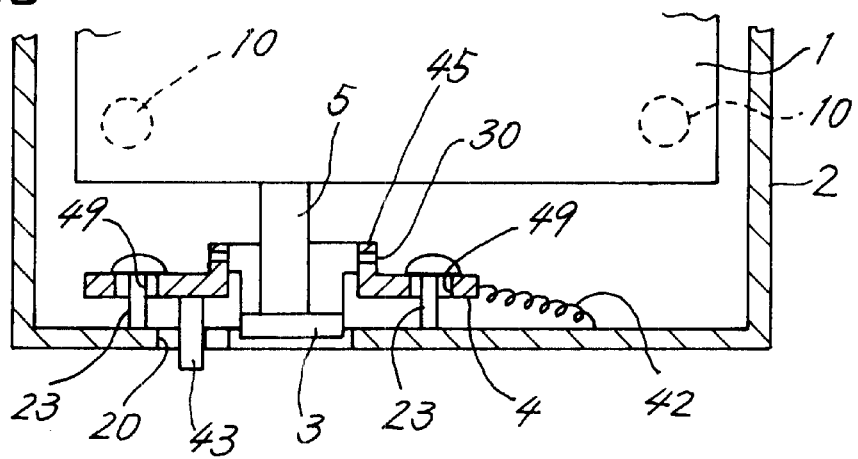
FIG. 6B is a similar view showing the same during recording.

In the recording mode, the lid 8 is locked as described above. FIGS. 6A and 6B are plan views showing the slide member 4 and the cabinet 2 in horizontal section, FIG. 6A showing the device in a mode other than the recording mode, FIG. 6B showing the device during recording.

Standby Position

In the mode other than the recording mode, the restraining piece 5 is in a retracted position with its forward end located away from the latch member 3, and the upper end of the latch member 3 is in contact with the slide member 4 as indicated in a solid line in FIG. 2. When thus positioned, the latch member 3 is in a standby position.

Locking Position

For recording, the restraining piece 5 moves toward the latch member 3 and pushes the latch member 3. As indicated in a chain line in FIG. 2, the latch member 3 moves about the pivot 30 on the slide member 4 to fit its upper end into the opening 21 of the cabinet 2. The slide member 4 is restrained from moving by the advance of the latch member 3 into the opening 21 as shown in FIG. 6B, preventing disengagement of the lid 8 from the slide member 4. This position of the latch member 3 is a locking position.

As seen in FIG. 6B, the slide member 4 is restrained from moving toward a lid releasing direction by the latch member 3 brought to its locking position and fitted in the cabinet 2. However, the restraining piece 5 needs only to hold the latch member 3 pushed toward the cabinet 2, and the restraining piece 5 and the chassis 1 are movable leftward or rightward within the range of the lateral width of the latch member 3. If the latch member 3 is given an increased lateral width, the restraining piece 5 and the chassis 1 are movable to and fro laterally over a greater range. This diminishes the likelihood that a shake, if given to the cabinet 2, will be delivered to the chassis 1.

Further because the chassis 1 can be positioned relative to the cabinet 2 with a greater lateral allowance involved than conventionally, high accuracy will not be required in installing the chassis 1. Accordingly, the arrangement of the present embodiment is usable also in recording or playback devices wherein no cushion member 10 is provided.

The chassis 1 is allowed to move to and fro greatly, with the latch member 3 in engagement with the cabinet 2, consequently ensuring a stabilized recording operation in spite of shaking that could occur, even if the engagement of the latch member 3 with the cabinet 2 involves a diminished clearance. When the clearance is thus reduced, the movement of the slide member 4 can be restrained accurately.

The latch member 3 of the embodiment described is pivoted at its lower end to the slide member 4, whereas the latch member 3 may be made of an elastic material so as to be elastically deformable by the movement of the restraining piece 5 and advance into the opening 21 of the cabinet 2. Thus, other means is usable insofar as the means causes the slide member 4 to engage with the cabinet 2 when pushed by the restraining piece 5.

What is claimed is:

1. A disk recording or playback device comprising a cabinet having a lid pivoted thereto, a chassis supported within the cabinet and provided with a pickup, a holder mounted on the chassis for upwardly or downwardly movement and connected to the lid to move with the lid when the lid is opened or closed, a slide member supported by the cabinet and engageable with, and disengageable from, the lid as said lid is pivotally moved to a lowered position, a restraining piece mounted on the chassis and retractably movable toward the slide member, and means for preventing the slide member from inadvertently moving in a direction of disengagement from the lid during signal recording, said movement-preventing means comprising a latch member having a wide pushable surface orthogonal to the direction of movement of the restraining piece is mounted on the slide member and movable upon contact with the restraining piece in the direction of movement of the restraining piece, the latch member being movable by the restraining piece between a locking position in which the latch member is engaged with the cabinet by being pushed into an opening therein by contacting the restraining piece to prevent the movement of the slide member when signals are recorded on a disk, and a standby position in which the latch member is free from the pushing contact of the restraining piece to permit the movement of the slide member in a mode other than the recording mode, and the restraining piece and the chassis being movable along the direction of movement of the slide member within a range in which the restraining piece is in pushing contact with the pushable surface of the latch member in the locking position.

2. A disk recording or playback device according to claim 1 wherein the chassis is attached to the cabinet by cushion members and is movable when subjected to impact.

* * * * *